United States Patent
Zimmermann et al.

(10) Patent No.: US 6,866,235 B2
(45) Date of Patent: Mar. 15, 2005

(54) ADHESIVE SHEET STRIP

(75) Inventors: Dieter Zimmermann, Jork (DE);
Holger Kartheus, Hamburg (DE);
Jürgen Christian Quandt, Klein Nordende (DE)

(73) Assignee: tesa Aktiengesellschaft, Hamburg (DE)

( * ) Notice: Subject to any disclaimer, the term of this patent is extended or adjusted under 35 U.S.C. 154(b) by 0 days.

(21) Appl. No.: 10/099,783

(22) Filed: Mar. 15, 2002

(65) Prior Publication Data

US 2003/0054164 A1 Mar. 20, 2003

(30) Foreign Application Priority Data

Mar. 20, 2001 (DE) .......................................... 101 13 422

(51) Int. Cl.$^7$ .............................................. C09J 175/04
(52) U.S. Cl. .................... 248/205.3; 248/301; 248/304; 428/354; 428/355 N; 428/343; 427/208; 427/208.4
(58) Field of Search ................................ 248/205.3, 301, 248/304; 428/354, 355 N, 343; 427/208, 208.4

(56) References Cited

U.S. PATENT DOCUMENTS

| | | | |
|---|---|---|---|
| 2,943,947 A | 7/1960 | Szukiewicz et al. | 106/266 |
| 4,024,312 A | 5/1977 | Korpman | 428/343 |
| 5,409,189 A | 4/1995 | Lühmann | 248/205.3 |
| 5,491,012 A | 2/1996 | Lühmann et al. | 428/40 |
| 5,626,931 A | 5/1997 | Lühmann | 428/40.1 |
| 5,626,932 A | 5/1997 | Lühmann et al. | 428/40.1 |
| 5,844,013 A | 12/1998 | Kenndoff et al. | 521/137 |
| 5,897,949 A | 4/1999 | Lühmann et al. | 428/317.3 |
| 6,004,665 A | 12/1999 | Lühmann et al. | 428/317.3 |
| 6,191,216 B1 | 2/2001 | Ganster et al. | 524/779 |
| 6,284,378 B1 | 9/2001 | Junghans et al. | 428/421 |
| 2003/0054164 A1 * | 3/2003 | Zimmermann et al. | 428/343 |

FOREIGN PATENT DOCUMENTS

| | | |
|---|---|---|
| DE | 33 31 016 | 10/1984 |
| DE | 195 31 696 | 3/1997 |
| DE | 196 49 636 | 6/1998 |
| DE | 196 49 728 | 6/1998 |
| WO | 92/11332 | 7/1992 |
| WO | 92/11333 | 7/1992 |
| WO | 94/21157 | 9/1994 |
| WO | 95/06691 | 3/1995 |
| WO | 97/07172 | 2/1997 |
| WO | WO 97/43328 | * 11/1997 |
| WO | 98/03601 | 1/1998 |

OTHER PUBLICATIONS

Handbook of Adhesive Technology; citation of "Activators", p. 515; edited by A Pizzi, KL Mittal, 1994.*

* cited by examiner

*Primary Examiner*—Daniel Zirker
(74) *Attorney, Agent, or Firm*—Norris McLaughlin & Marcus PA

(57) ABSTRACT

An adhesive sheet strip for a redetachable bond, removable from a joint by pulling in the direction of the bond plane, having a nonadhering grip tab and a subsequent single-sidedly or double-sidedly adhering strip, which comprises of:

a) a backing composed of a film having a tensile strength of 2–20 N/cm and an elongation at break of 200–800%, and b) applied to at least one side thereof, a polyurethane-based adhesive comprising:
60–80% by weight of an aliphatic isocyanate/polyol crosslinking system,
15–35% by weight of a filler, and
0.05–0.20% by weight of an activator, based on the total weight of the adhesive.

11 Claims, No Drawings

ADHESIVE SHEET STRIP

FIELD OF THE INVENTION

The invention relates to an adhesive sheet strip for a redetachable bond, removable from a joint by pulling in the direction of the bond plane.

BACKGROUND OF THE INVENTION

Elastically or plastically highly extensible self-adhesive tapes which by stretching substantially in the bond plane (referred to as stripping) may be redetached without residue or destruction even from in some cases highly sensitive bond substrates, such as papers or coated woodchip wallpaper, for example, are described in U.S. Pat. No. 4,024,312, DE 33 31 016, WO 92/11332, WO 92/11333, DE 42 22 849, WO 95/006691, DE 195 31 696, DE 196 26 870, DE 196 49 727, DE 196 49 728, DE 196 49 729 and DE 197 08 366. They are frequently employed in the form of adhesive tape strips having a preferably nonadhesive grip tab region from which the detachment process is initiated. Particular applications and embodiments of self adhesive tapes of this kind can be found, inter alia, in DE 42 33 872, WO 94/21157, DE 44 28 587, DE 44 31 914, WO 97/07172, DE 196 49 636 and WO 98/03601.

No convincing success has to date been achieved, however, by the use of polyurethane (PU) adhesives for such products. The reason for this is that, as described for example in DE 196 18 825 A1, adhesives exude though the poster paper, for example, when used in this way and are therefore unsuitable for consumer applications. Even the improved hydrophilic polyurethane gel composition of WO 97/43328 is unsuited to such applications. When bonded to paper and stored at 40° C. or 70° C., admittedly, there is only superficial exudation onto the paper, but after Solila irradiation (lamp: OSRAM, ULTRA VITALUX 300W/200-230V, E27) the adhesive undergoes a slight yellowish discoloration and then exudes through the paper.

DETAILED DESCRIPTION OF THE INVENTION

It is an object of the invention to remedy the deficiencies associated with the use of PU in adhesive products and provide a PU adhesive product which is suitable for consumer applications even following heat and sun exposure.

A further object of the invention is to provide an adhesive bond to a surface which comprises of applying the adhesive sheet strip of the invention to said surface wherein parting of the adhesive bond, by pulling on said adhesive strip in the direction of the bond plane, renders said surface damage-free and residueless.

We have found that this object is achieved by means of adhesive sheet strips for a redetachable bond, removable from a joint by pulling in the direction of the bond plane, having a nonadhering grip tab and a subsequent single-sidedly or double-sidedly adhering strip, which comprises of:

(a) a backing composed of a film having a tensile strength of 2–20 N/cm and an elongation at break of 200–800%, and (b) applied to at least one side thereof, a polyurethane-based adhesive comprising:
60–80% by weight of an aliphatic isocyanate/polyol crosslinking system,
15–35% by weight of a filler, and
0.05–0.20% by weight of an activator, based on the total weight of the adhesive.

The adhesive sheet strip described above preferably has a total thickness of 50–5000 μm and more preferably 100–2000 μm.

The backing described above in (a) preferably has a thickness of 40–80 μm and is made of polymer such as polyethylene (PE), polypropylene (PP) or polyurethane.

The polyurethane-based adhesive described above in (b) preferably has a thickness of 10–80 μm and may be applied on one side or both sides of the backing. Preferably, the polyurethane-based adhesive is crosslinked thermally and optionally additionally by EBC (electron-beam curing) and optionally is additionally crosslinked at the cut edges by UV or EBC.

A preferred embodiment of the adhesive sheet strip of the invention is a 3-layer fixer whose two outer layers are composed of the PU-based adhesive of the invention. The middle layer is composed of a film 40–80 μm thick and of polyethylene (PE), polypropylene (PP), PU, etc. which has a tensile strength of 2–20 N/m and an elongation at break of 200–800%.

Suitable components for the PU-based adhesive used in accordance with the invention are as follows.

A suitable polyol is in principle any compound having free OH groups which can be reacted with an isocyanate to give a polyurethane. Particularly suitable is an industrially prepared polyetherpolyol (Levagel E) together with the natural product castor oil. Levagel E (manufacturer: Bayer A G, Leverkusen, Germany; see Bayer safety data sheet 823086) is stabilized by its manufacturer with 0.1% of D,L-tocopherol as antioxidant. For the purposes of the invention, the amount of stabilizer is preferably increased to 0.5% (+0.4%), by weight based on the total weight of the PU-based adhesive. This guarantees a stable end product for 3–5 years. D,L-tocopherol is Irganox E 201 from CIBA or Ronotec 201 from Hoffman-La Roche.

Castor oil (manufacturer/supplier: Jan Dekker and Henry Lamotte; see companies' safety data sheets) has a minimum OH number of 160. This product is partly stabilized with a mixture of natural tocopherols.

A preferred isocyanate is the Bayer A G product Desmodur KA 8712 (Bayer safety data sheet 822551). In chemical terms, it is modified hexamethylene diisocyanate (HDI).

Suitable fillers may be selected from the group consisting of an absorbent, zinc oxide, calcium carbonate, magnesium carbonate and mixtures thereof.

Preferred fillers include (% by weight):

a filler: superabsorbent Favor T (a polyacrylate)
  manufacturer: Stockhausen, Krefeld, Germany
  amount used: 5–15%, preferably from 5–10%.
  purpose of use: adhesion to slightly moist substrate and/or bonding in areas with highly atmospheric humidity.

b filler: zinc oxide
  manufacturer: Grillo
  amount used: 5–10%
  purpose of use: a filler which provides ideal properties for Poster-Strips and Power-Strips. It provides outstanding optical qualities, does not greatly reduce elasticity and tensile strength, and prevents exudation through paper substrates.

c filler: calcium carbonate and magnesium carbonate
  manufacturers: chemical suppliers, e.g., Merck, Darmstadt, Germany
  amount used: 5–10%.
  purpose of use: special fillers which improve the optical properties of the product, secure the spatial stability (form) of the product, prevent exudation through paper substrates, and absorb any polyurethane degradation products.

disadvantage: some of the elasticity of the product is lost.

Backing Film

As the central film, use was made in particular of Platilon OU73 (from Wolff, Walsrode, Germany: polyurethane ether).

Formulations

The bond strength of the compositions are determined predominantly by the polyol used and the characteristic number for identical degree of crosslinking (DC=(actual amount of isocyanate *100)/calculated amount of isocyanate).

For comparison, the degree of crosslinking is adjusted to 45.0. All percentages are by weight.

| R1 | |
|---|---|
| Levagel E | 77.44% |
| Stabilizer E | 0.29% |
| Zinc oxide | 10.00% |
| Favor T | 5.00% |
| Reaktor B | 7.17% |
| Activator | 0.10% |
| R2 | |
| Castor oil | 60.66% |
| Stabilizer E | 0.22% |
| Zinc oxide | 10.00% |
| Favor T | 5.00% |
| Reaktor B | 24.02% |
| Activator | 0.10% |
| R3 | |
| Levagel E | 80.17% |
| Stabilizer E | 0.30% |
| MgCO$_3$ | 10.00% |
| Favor T | 5.00% |
| Reaktor B | 7.43% |
| Activator | 0.10% |
| R4 | |
| Castor oil | 62.76% |
| Stabilizer E | 0.23% |
| MgCO$_3$ | 10.00% |
| Favor T | 5.00% |
| Reaktor B | 24.91% |
| Activator | 0.10% |

The generic name for stabilizer E is D,L-α-tocopheral (vitamin E) and for Reaktor B (from Bayer AG) is an isocyanato-polyurethane based on hexamethylenediisocyanate.

Adhesive Preparation

These adhesives are preferably prepared in an evacuable mixer. The Levagel E, for example, is introduced as an initial charge. Then the remaining formulation components are added in succession with stirring and the dispersion is subsequently mixed thoroughly again. The composition is then freed from bubbles by evacuation. Because of the very different requirements, different formulations are employed.

Production of the Bale Product

The three components component A (dispersion)

component B (isocyanate)

component C (activator)

component C is used in dilute solution (2–10%) for technical reasons are mixed with one another in a high-speed rotating mixer head and applied by a twin-coater system (blade coater and roller coater) to a 90 g paper siliconized on both sides. The applied adhesive is lined with a PE/PU composite film.

The PU composition reacts in a heating tunnel at 70° C. and is then wound up. The zinc oxide compositions in particular require a maturation time, say of 30–120 minutes, for complete reaction. Only then is it possible to remove the PE film from the PU film and to apply the $2^{nd}$ layer. For this purpose, the PE support film is removed before the coater system and the $2^{nd}$ layer of the composition is coated directly onto the PU film. This is lined with a PETP (polyethylene terephthalate) film (36 μm) siliconized on one side. Like layer 1, the $2^{nd}$ layer is cured in a heating tunnel at 70° C. and the assembly is then wound up. Following the maturation time, the bale product is ready for cutting and converting—to Poster-Strips and Power-Strips, as already known.

Optionally, the laminate (PU composition/film/PU composition) is cured by exposure to electron beams on both sides using, for example, a Polymer Physics unit: 230 kV and 60 kGy.

The material is then cut up into parent rolls 7 cm wide. The known tesa Posterstrip formats are then produced individually by means of rotary punching. Exposed punch-cut edges can then be irradiated (EBC or UV) so that on bonds on glass, for example, there are no longer any cut-edge contours.

The resulting specimens (punched specimens) were irradiated in particular (at 40° C.) with the Solila (OSRAM, ULTRA-VITALUX, 300 W, 220-230 V, E 27):

| after 24 h | still tacky |
|---|---|
| after 2 d | slightly tacky |
| after 3 d | almost tack-free |
| after 4 d | tack-free |
| | no discoloration, no residues after bonding. |

Because of the plasticity of the product, there is almost always a 100% bond area even on rough surfaces (e.g., coated woodchip), and it is therefore highly suitable for attaching posters.

With an absorbent fraction for water (Favor T), the material also adheres well to very moist substrates.

The test standards for bond strength and elongation at break are laid down in the test standards DIN ISO EN 527-3.

What is claimed is:

1. An adhesive sheet strip for a redetachable bond, removable from a joint by pulling in the direction of the bond plane, having a nonadhering grip tab and a subsequent single-sided or double-sided adhering strip, which comprises:
   a) a backing composed of a film having a tensile strength of 2–20 N/cm and an elongation at break of 200–800%, and
   b) applied to at least one side thereof polyurethane based adhesive comprising:
      60–80% by weight of on aliphatic isocyanate/polyol crosslinking system.
      15–35% by weight of a filler, and
      0.05–0.20% by weight of an activator, based on the total weight of the adhesive.

2. The adhesive sheet strip as claimed in claim 1, wherein the film is 40–80 μm thick.

3. The adhesive sheet strip of claim 2 wherein the film is made of a compound selected from the group consisting of polyethylene, polypropylene and polyurethane.

4. The adhesive sheet strip as claimed in claim 1, wherein the adhesive is crosslinked thermally and, optionally, additionally by electron-beam curing, and optionally is additionally crosslinked at the cut edges, which are formed after the adhesive sheet strip has been cut, by UV or by further electron-beam curing.

5. The adhesive sheet strip as claimed in claim 1, wherein the alphatic isocyanate/polyol crosslinking system comprises of: (1) an optionally modified hexamethylene diisocyanate as the aliphatic isocyanate component and (2) a polyetherpolyol and castor oil, which is optionally stabilized with tocopherols, as the polyol component.

6. The adhesive sheet strip as claimed in claim 1, wherein the filler is selected from the group consisting of an absorbent, zinc oxide, calcium carbonate, magnesium carbonate and mixtures thereof.

7. The adhesive sheet strip as claimed in claim 1, wherein the adhesive has been applied to both sides of the backing.

8. The adhesive sheet strip as claimed in claim 1, wherein the adhesive is 10–80 $\mu$m thick.

9. The adhesive sheet strip as claimed in claim 1, wherein the entire thickness of the adhesive sheet strip is 50–5000 $\mu$m.

10. The adhesive sheet strip as claimed in claim 1, wherein the entire thickness of the adhesive sheet strip is 100–2000 $\mu$m.

11. A method of providing an adhesive bond to a surface which comprises applying the adhesive sheet strip of any one of claims 1–10 to said surface wherein parting of the adhesive bond, by pulling on said sheet strip in the direction of the bond plane, renders said surface damage-free and residueless.

* * * * *